(12) United States Patent
Naoi

(10) Patent No.: US 7,663,634 B2
(45) Date of Patent: Feb. 16, 2010

(54) DRAWING PROCESSING APPARATUS AND DRAWING PROCESSING METHOD FOR MULTIPASS RENDERING

(75) Inventor: Junichi Naoi, Tokyo-to (JP)

(73) Assignee: Sony Computer Entertainment Inc., Tokyo (JP)

( * ) Notice: Subject to any disclaimer, the term of this patent is extended or adjusted under 35 U.S.C. 154(b) by 276 days.

(21) Appl. No.: 11/384,204

(22) Filed: Mar. 17, 2006

(65) Prior Publication Data

US 2006/0267981 A1  Nov. 30, 2006

(30) Foreign Application Priority Data

May 27, 2005  (JP) .............................. 2005-155936

(51) Int. Cl.
*G06T 1/20* (2006.01)
(52) U.S. Cl. ...................... 345/506; 345/418; 345/419; 345/426; 345/501; 345/502
(58) Field of Classification Search ................ 345/418, 345/419, 426, 501, 502, 506
See application file for complete search history.

(56) References Cited

U.S. PATENT DOCUMENTS

| | | | | |
|---|---|---|---|---|
| 5,579,455 A * | 11/1996 | Greene et al. | ................ | 345/422 |
| 5,847,717 A * | 12/1998 | Berry | ........................ | 345/506 |
| 6,118,452 A * | 9/2000 | Gannett | ...................... | 345/418 |
| 6,259,461 B1 * | 7/2001 | Brown | ........................ | 345/556 |
| 6,483,505 B1 * | 11/2002 | Morein et al. | ................ | 345/419 |
| 6,492,991 B1 * | 12/2002 | Morein et al. | ................ | 345/555 |
| 6,636,212 B1 * | 10/2003 | Zhu | ............................ | 345/421 |
| 6,697,063 B1 * | 2/2004 | Zhu | ............................ | 345/421 |
| 6,961,065 B2 * | 11/2005 | Sasaki | ........................ | 345/582 |
| 7,023,437 B1 * | 4/2006 | Voorhies et al. | ............. | 345/420 |
| 7,277,098 B2 * | 10/2007 | Xu et al. | ...................... | 345/555 |
| 7,450,120 B1 * | 11/2008 | Hakura et al. | ................ | 345/421 |
| 2003/0117589 A1 * | 6/2003 | Sasaki | ........................ | 353/30 |
| 2005/0122338 A1 * | 6/2005 | Hong et al. | .................. | 345/546 |

OTHER PUBLICATIONS

Computer Graphics: Principles and Practice—Second Edition in C; Foley, van Dam, Feiner, Hughes; pp. 883-885; ISBN 0-201-84840-6; 1996.*

* cited by examiner

*Primary Examiner*—Ulka Chauhan
*Assistant Examiner*—Daniel Washburn
(74) *Attorney, Agent, or Firm*—Katten Muchin Rosenman LLP

(57) ABSTRACT

A drawing processing apparatus capable of executing a drawing processing program having conditional branches efficiently by multipass rendering. The drawing processing apparatus comprises arithmetic processing parts including an object input part, a primitive generating part, a raster part, a pixelation part, a distribution part, and a shader which constitute pipeline stages. The shader divides the program into and executes the same in a plurality of passes depending on conditional branches. The shader generates enable flags determining whether or not respective pixels satisfy branch conditions. The flag generating part generates bind enable flags which are the enable flags on the pixels bound into the processing granularities of the pipeline stages, and feeds back the same to the respective pipeline stages. The arithmetic processing parts in the individual pipeline stages refer to the bind enable flags and limit the submission of data not targeted for arithmetic processing in the branched passes.

10 Claims, 11 Drawing Sheets

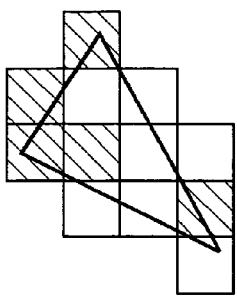
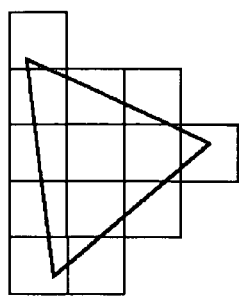
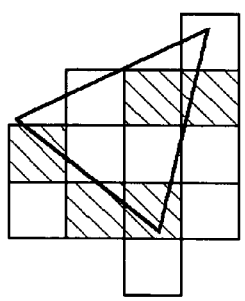
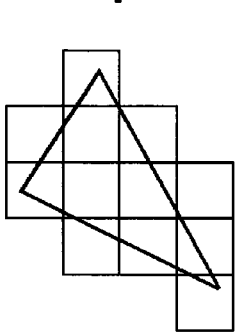
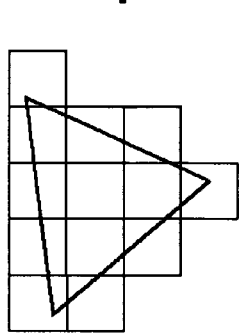
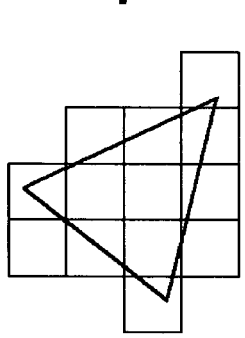
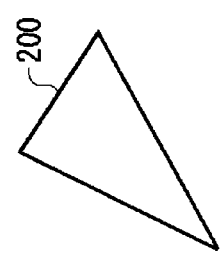

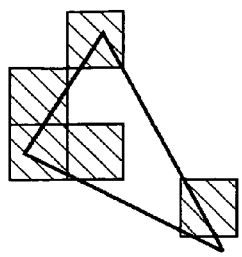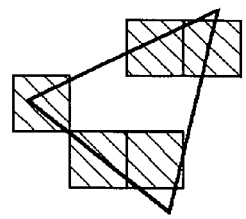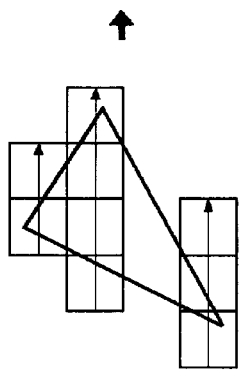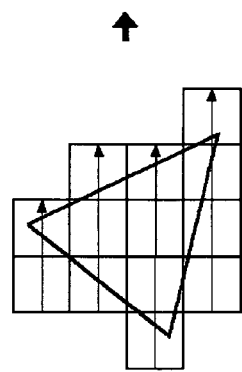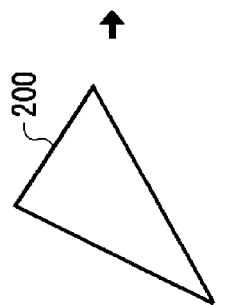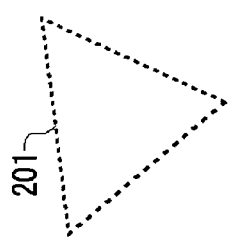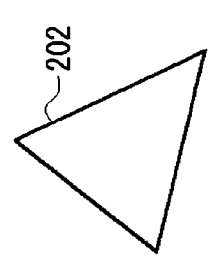

DRAWING PROCESSING APPARATUS AND DRAWING PROCESSING METHOD FOR MULTIPASS RENDERING

BACKGROUND OF THE INVENTION

1. Field of the Invention

The invention relates to a drawing processing apparatus and a drawing processing method for processing drawing data.

2. Description of the Related Art

Rendering engines for three-dimensional computer graphics are now gaining programmability and becoming more processor-like in order to cope with complex, sophisticated shading algorithms. In particular, pixel shaders, the cores of the rendering engines, are transforming themselves from hardware pieces which implement fixed graphics capabilities into processors which have built-in arithmetic units having instruction sets, like CPUs, and are capable of adding capabilities flexibly by programming.

In current programmable pixel shaders, polygon setting is performed on three-dimensional objects to be drawn before the pixel data obtained by rasterizing the polygons is processed to calculate final color values. To achieve more complex shading processing, a technique called multipass rendering is used. Multipass rendering is the technique of dividing the shading processing into a plurality of operation passes, and applying different arithmetic processes to identical drawing primitives a plurality of times. This technique allows finer drawing processing for higher drawing quality.

In multipass rendering, the drawing processing on one or more drawing primitives is divided into and performed in a plurality of passes. Some passes may fail to process all the drawing primitives at a time due to limited buffer capacities, however, in which case the passes are divided into intervals having a certain number of pixels each and the arithmetic processes on the passes are performed interval by interval. For example, given passes 1 to n, an arithmetic process is performed from the pass 1 in order. When the arithmetic process is completed up to the pass n, the arithmetic process of the next interval is then performed similarly from the pass 1 to the pass n. This can be repeated to achieve the multipass rendering on the pixel data of all the drawing primitives.

For the sake of higher programming flexibility, programs make heavy use of control structures such as conditional branches and loops. When such control structures as conditional branches are introduced into multipass rendering, it is required to exercise a program control across passes. Necessary conditional data on all the pixels to be processed must therefore be collected for analysis, with a large amount of processing cost. The program control across passes also increases overhead ascribable to pass switching, which costs the processing efficiency. Thus, in multipass rendering, it is actually the case that the control structures of the programs must be confined within individual passes.

SUMMARY OF THE INVENTION

The present invention has been achieved in view of the foregoing problems. It is thus a general purpose of the present invention to provide a drawing processing technology capable of executing a complex drawing processing program by multipass rendering efficiently.

To solve the foregoing problems, one of the embodiments of the present invention provides a drawing processing apparatus for performing multipass rendering in which drawing processing on a drawing object is divided into and processed in a plurality of operation passes. The apparatus comprises a pipeline processing mechanism having a plurality of arithmetic processing parts which process the drawing object in units of processing of respective different granularities, the arithmetic processing parts constituting a plurality of pipeline stages in descending order of processing granularities. Here, each of the arithmetic processing parts: acquires a flag for indicating, in the processing granularity of that arithmetic processing part, whether or not each of the units of processing is targeted for arithmetic processing in a subsequent operation pass; and in the subsequent operation pass, performs the arithmetic processing on only the unit of processing targeted for the arithmetic processing with reference to the flag, and supplies data resulting from the arithmetic processing to the arithmetic processing part in the subsequent stage.

The arithmetic processing part at the final stage may: generate determination flags for determining, in the processing granularity of the arithmetic processing part at the final stage, whether or not the respective units of processing are targeted for arithmetic processing in a subsequent operation pass; bind up the determination flags into the processing granularities of the arithmetic processing parts in the respective stages, thereby generating bind flags for indicating, in the processing granularities of the arithmetic processing parts in the respective stages, whether or not the individual units of processing are targeted for arithmetic processing in a subsequent operation pass; and supply the bind flags to the arithmetic processing parts in the respective stages. Here, "the final stage" shall refer to the final one in the plurality of pipeline stages currently in question. One or more other pipeline stages may thus exist subsequent to the plurality of pipeline stages in question.

Another embodiment of the present invention also provides a drawing processing apparatus. This drawing processing apparatus is one for performing multipass rendering in which drawing processing on a drawing object is divided into and processed in a plurality of operation passes, comprising: a rasterizer which rasterizes the drawing object to generate pixel data; and a pixel processing part which performs arithmetic processing on the pixel data generated by the rasterizer. The pixel processing part has a flag generating part which generates determination flags for determining whether or not the respective pixels are targeted for arithmetic processing in a subsequent operation pass, and supplying the determination flags to the rasterizer. This pixel processing part may be a fixed piece of hardware which is made of a certain pixel operation circuit, or a general-purpose pixel shader which functions in cooperation with software.

The rasterizer may include a pipeline processing mechanism having a plurality of arithmetic processing parts which process the drawing object in units of processing of respective different granularities, the arithmetic processing parts constituting a plurality of pipeline stages in descending order of processing granularities. The flag generating part may: bind up the determination flags determined pixel by pixel into the processing granularities of the arithmetic processing parts in the respective stages, thereby generating bind flags for indicating, in the processing granularities of the arithmetic processing parts in the respective stages, whether or not the individual units of processing are targeted for arithmetic processing in a subsequent operation pass; and supply the bind flags to the arithmetic processing parts in the respective stages.

The rasterizer may include a primitive generating part which generates data on one or more drawing primitives constituting the drawing object. The flag generating part may bind up the determination flags determined pixel by pixel into units of the drawing primitives, thereby generating bind flags for indicating whether or not the units of the drawing primitives are targeted for arithmetic processing in a subsequent operation pass, and supply the bind flags to the primitive generating part.

The rasterizer may further include a digital differential analysis part which converts the drawing primitive into pixel data with respect to each scan line through digital differential analysis processing. The flag generating part may bind up the determination flags determined pixel by pixel into units of the digital differential analysis processing, thereby generating bind flags for indicating whether or not the units of the digital differential analysis processing are targeted for arithmetic processing in a subsequent operation pass, and supply the bind flags to the digital differential analysis part.

Yet another embodiment of the present invention provides a drawing processing method. This drawing processing method is one for multipass rendering in which drawing processing on a drawing object is divided into and processed in a plurality of operation passes. In this method, a final pipeline stage of a pipeline processing mechanism having a plurality of pipeline stages for processing the drawing object in units of processing of respective different granularities, the pipeline stages being connected in descending order of processing granularities, generates flags for determining, in the processing granularities of the respective pipeline stages, whether or not the individual units of processing are targeted for arithmetic processing in a subsequent operation pass, and feeds back the flags to the pipeline stages; and in the subsequent arithmetic pass, the pipeline stages perform arithmetic processing only on the units of processing targeted for arithmetic processing with reference to the flags fed back, and supply data resulting from the arithmetic processing to the respective subsequent pipeline stages.

Yet another embodiment of the present invention also provides a drawing processing method. This drawing processing method is one for multipass rendering in which drawing processing on a drawing object is divided into and processed in a plurality of operation passes. The method comprises: rasterizing the drawing object to generate pixel data; performing arithmetic processing on the pixel data generated; and determining, in the process of the arithmetic processing, whether or not the individual pixels are targeted for arithmetic processing in a subsequent operation pass. In generating the pixel data in the subsequent operation pass, only the pixel data targeted for the arithmetic processing is generated by referring to a result of determination of the determining step.

Incidentally, any combinations of the foregoing components, and any conversions of expressions of the present invention from/into methods, apparatuses, systems, computer programs, data structures, and the like are also intended to constitute applicable embodiments of the present invention.

BRIEF DESCRIPTION OF THE DRAWINGS

FIGS. 10A to 10L are diagrams for explaining how the rasterizer of FIG. 1 rasterizes objects and the shader makes determinations on a branch condition pixel by pixel; and FIGS. 11A to 11G are diagrams for explaining how the objects are processed by the rasterizer of FIG. 1 in the branched pass.

DETAILED DESCRIPTION OF THE INVENTION

Figure 1:
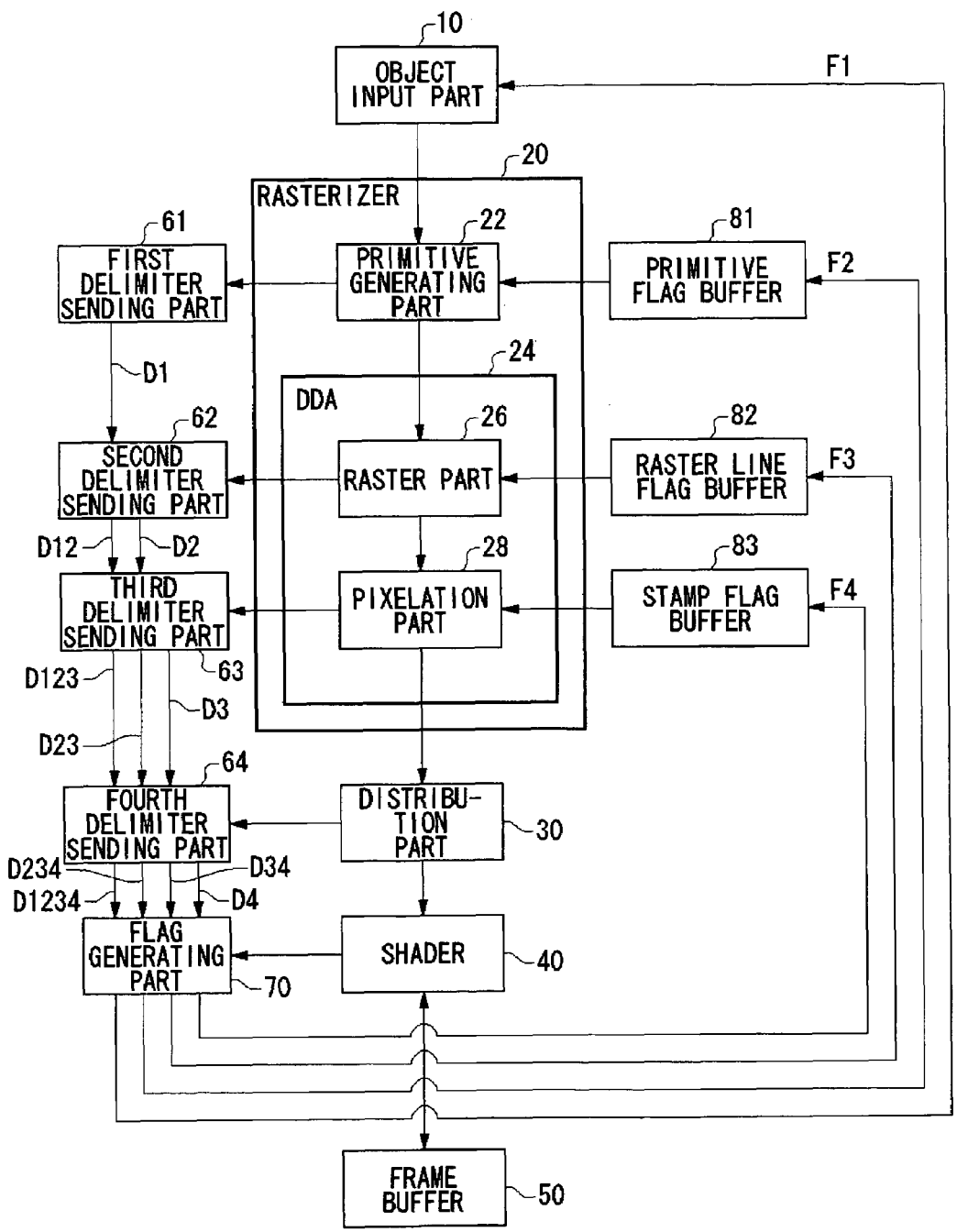
FIG. 1 is a block diagram of a drawing processing apparatus according to an embodiment.

FIG. 1 is a block diagram of a drawing processing apparatus 100 according to an embodiment. The drawing processing apparatus 100 performs rendering processing for generating drawing data to be displayed on a two-dimensional screen based on three-dimensional model information on objects to be drawn, by using the technique of multipass rendering. In multipass rendering, programs to be executed on drawing objects are divided into and processed in a plurality of passes, so that the drawing objects are processed repeatedly pass by pass.

An object input part 10 supplies polygonal model information on a drawing object (hereinafter, referred to simply as "object") to a rasterizer 20. The object input part 10 may be a dedicated processor for generating the polygonal model information, or a vertex shader.

The rasterizer 20 includes a primitive generating part 22 and a digital differential analyzer (DDA) 24. The primitive generating part 22 generates a stream which contains the vertex coordinates and parameters of one or more drawing primitives (hereinafter, referred to simply as "primitives") for constituting an object, based on polygonal model information on the object received from the object input part 10. Primitives are the units of drawing of geometric figures when rendering a three-dimensional object in a polygonal model, such as points, lines, triangles, and rectangles.

The primitive generating part 22 sets up various types of parameters for processing a stream of primitives by using the DDA 24. Specifically, it sets bounding boxes for dividing the space containing the primitives, and sets various parameters for DDA processing such as edge factors.

The primitive generating part 22 has the functions of suspending and resuming primitive generation. In accordance with a control signal from a shader 40, the primitive generating part 22 performs pass switching for multipass rendering, and executes processing on the next pass. When the processing goes through all the passes and returns to the first pass again, the primitive generating part 22 resumes generating the primitives from the positions of the primitives suspended the last time.

The primitive generating part 22 supplies the stream data on the generated primitives to the DDA 24. The DDA 24 acquires vertex data on the primitives from the primitive generating part 22, and converts the primitives into pixels corresponding to the drawing screen.

For instance, the primitives shall be triangular in shape. The DDA 24 performs view transformation for transforming the triangles in three-dimensional space into triangles on the drawing plane through projection transform. The DDA 24 also scans the drawing plane for triangles in the horizontal direction of the drawing plane while converting them into quantized pixels with respect to each of raster lines. In the DDA 24, the primitives are developed into pixels. For each of the pixels, pixel information including color values expressed in three primary colors RGB, an alpha value for indicating transparency, an Z value for indicating a depth, and UV coordinate values, or parametric coordinates for referring to texture attributes, is calculated.

The DDA 24 includes a raster part 26 and a pixelation part 28. The raster part 26 scans a primitive, for example, in the horizontal direction, and divides the primitive into a plurality of raster lines. As employed herein, a raster line does not refer to a single row of pixels but one having a predetermined width of pixels. The raster part 26 supplies a stream consisting of the plurality of raster lines to the pixelation part 28. The pixelation part 28 divides the raster lines supplied from the raster part 26 into rectangular areas of predetermined size (hereinafter, these rectangular areas will be referred to as "stamps"), and pixelates the raster lines stamp by stamp.

In general, the greater areas the primitives input to the DDA 24 have, the higher the numbers of pixels the primitives are pixelated into. Moreover, when primitives are close to the point of view and must therefore be drawn in higher levels of detail, the numbers of pixels generated from the primitives increase. In the primitive generating part 22, primitives are expressed as vertex data and thus have small amounts of data. After pixelated by the DDA 24, the numbers of pixels and the amounts of data become greater.

A distribution part 30 supplies the stamps generated by the pixelation part 28 to the shader 40. The stamps are the units of the DDA processing, and the units of the drawing processing by the shader 40 as well. The shader 40 has a plurality of pipeline units for processing a plurality of stamps in a pipeline fashion in parallel. The distribution part 30 distributes the plurality of stamps to any of the pipeline units.

The shader 40 performs shading to determine the color values of the pixels based on the pixel information calculated by the rasterizer 20. When texture mapping is required, the shader 40 also synthesizes color values of textures to calculate the final color values of the pixels, and writes the pixel data to a frame buffer 50.

The shader 40 further applies such processing as fogging and alpha blending to the drawing data held in the frame buffer 50, thereby determining the final color values of the pixels and updating the pixel data in the frame buffer 50.

The shader 40 executes a drawing processing program by pipeline processing. The shader 40 has a mechanism for inputting the result of operation of the pipeline processing to an arbitrary pipeline stage for feedback. For multipass rendering, this feedback loop can be utilized to perform such processing that the result of operation on one pass processed before is passed to the next pass for overwrite.

The frame buffer 50 is one for storing the pixel data generated by the shader 40 in association with screen coordinates. The pixel data stored may be either that of a final drawing image or that of an intermediate image in the process of shading. The pixel data stored in the frame buffer 50 is output to and displayed on a display unit.

The arithmetic processing parts of the drawing processing apparatus 100, i.e., the object input part 10, the primitive generating part 22, the raster part 26, the pixelation part 28, the distribution part 30, and the shader 40 constitute a plurality of pipeline stages in this order. The units of processing in the object input part 10, the primitive generating part 22, the raster part 26, the pixelation part 28, the distribution part 30, and the shader 40 are objects, primitives, raster lines, stamps, and pixels, respectively, which are listed in descending order of processing granularities, that is from coarse to fine granularities.

As mentioned above, the drawing processing apparatus 100 has the pipeline processing mechanism which proceeds with the arithmetic processing while increasing the processing granularities stepwise along the pipeline stages in order of objects, primitives, raster lines, stamps, and pixels. The individual arithmetic processing parts, i.e., the object input part 10, the primitive generating part 22, the raster part 26, the pixelation part 28, the distribution part 30, and the shader 40 thus function as the piping units in the respective pipeline stages of the pipeline processing mechanism.

The shader 40 divides the drawing processing program into and executes it in a plurality of passes, which are variable in length. In the present embodiment, the code string of the program is divided depending on conditional branches in the program, and the resulting branches are considered as new passes or the plurality of passes the program is divided into.

Rasterizing an object and executing the drawing processing program on all the pixels within the single object may be regarded as an SIMD (single instruction multiple data) operation for processing a plurality of pieces of data with a single instruction. Since pixels are submitted to the pipeline units of the shader 40 continuously, the parallelism of SIMD operations is developed in the time-base direction. If the program branches on condition, all the pixels of the object need not necessarily be targeted for the arithmetic processing on those branches. In fact, it is rare that all the pixels of an object have the same condition.

When the conditional branches of the drawing processing program become complicated and increase in number, submitting all the pixels of an object to every program branch is ineffective and can deteriorate the processing efficiency. This is the reason why multipass rendering can typically deteriorate in efficiency because of conditional branched. Then, in the present embodiment, the program is divided into passes depending on conditional branches, and the branched passes exercise control so as to reject pixels not satisfying the branch conditions as much as possible.

Figure 2:
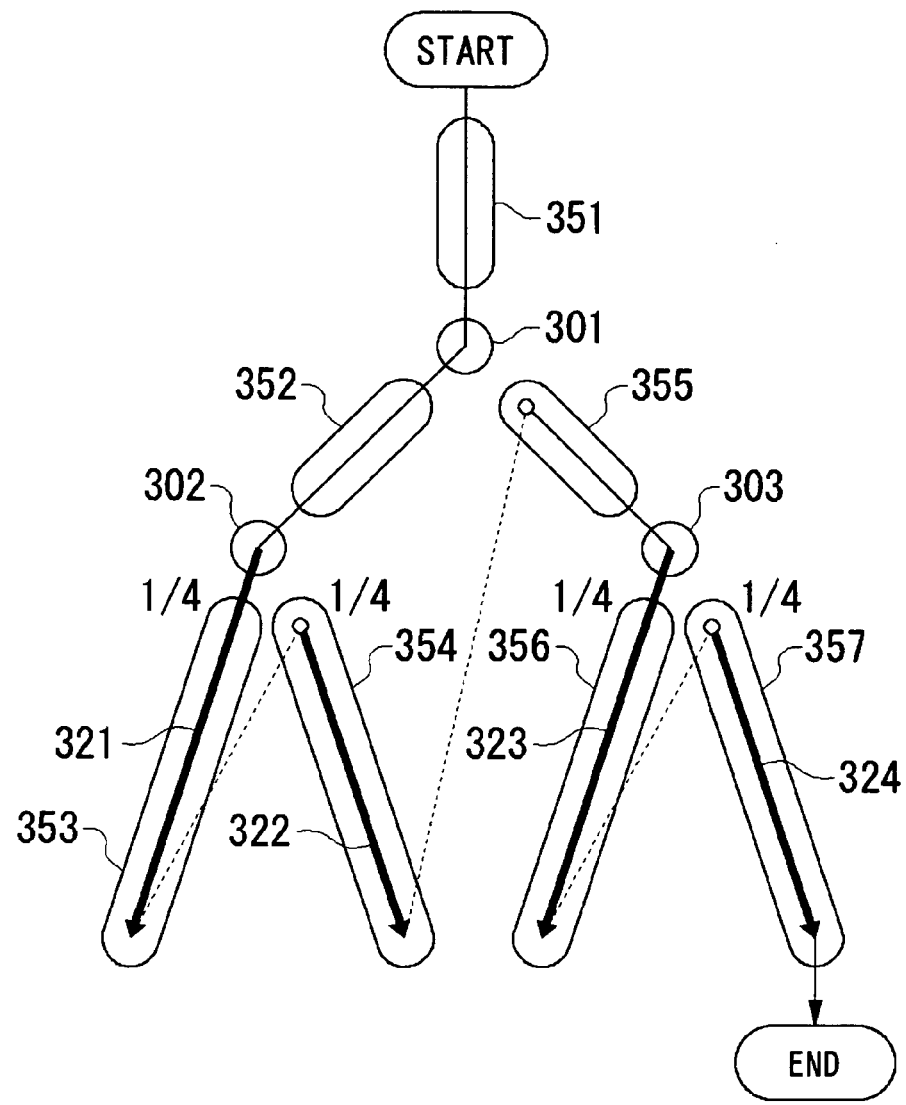
FIG. 2 is a diagram for explaining the flow of a drawing processing program to be executed by the drawing processing apparatus of FIG. 1.

FIG. 2 is a diagram for explaining the flow of the drawing processing program to be executed by the drawing processing apparatus 100. The drawing processing program is divided into a first code string 351 to a seventh code string 357, being divided at a first conditional branch 301 to a third conditional branch 303. Since the drawing processing apparatus 100 divides the drawing processing program into the plurality of passes as divided at the conditional branches, the first code string 351 to the seventh code string 357 simply correspond to first to seventh passes, respectively. The arrows in the diagram show the order of execution of the drawing processing program.

The first code string 351 of the program is executed as the first pass. When the first conditional branch 301 is reached, the branched second code string 352 is executed as the second pass. The program reaches the second conditional branch 302, and the branched third code string 353 is executed as the third pass. The program then returns to the originating second conditional branch 302, and the fourth code string 354 is executed as the fourth pass.

Subsequently, the program returns to the originating first conditional branch 301, and the fifth code string 355 is executed as the fifth pass. The program reaches the third conditional branch 303, and the branched sixth code string 356 is executed as the sixth pass. Subsequently, the program returns to the originating third conditional branch 303, and the seventh code string 357 is executed as the seventh pass, whereby the execution of the entire program is completed.

For example, the first conditional branch 301 braches depending on the condition whether a variable A of the program is 0 or 1. If A=0, it branches to the second code string 352. If A=1, it branches to the fifth code string 355. The second conditional branch 302 branches depending on the condition whether a variable B is 0 or 1. If B=0, it branches to the third code string 353. If B=1, it branches to the fourth code string 354. The third conditional branch 303 branches depending on the condition whether the variable B is 0 or 1. If B=0, it branches to the sixth code string 356. If B=1, it branches to the seventh code string 357.

While the first code string 351 is executed in the first pass, the values of the variables A and B on each pixel within the object are examined, and determinations are made as to whether or not they satisfy the branch conditions.

Pixels with A=0 and B=0 are processed by the branched third code string 353. Pixels with A=0 and B=1 are processed by the branched fourth code string 354. Pixels with A=1 and B=0 are processed by the branched sixth code string 356. Pixels with A=1 and B=1 are processed by the branched seventh code string 357.

Thus, the drawing processing apparatus 100 submits only the pixels satisfying the conditions of A=0 and B=0 to the third pass, the pixels satisfying the conditions of A=0 and B=1 to the fourth pass, the pixels satisfying the conditions of A=1 and B=0 to the sixth pass, and the pixels satisfying the conditions of A=1 and B=1 to the seventh pass. Assuming that the number of pixels satisfying each of the branch conditions is ¼ of the total number of pixels, the processing efficiency improves since the amount of data to be submitted to the branched third, fourth, sixth, and seventh passes is limited to a quarter.

To achieve this control for pass-by-pass pixel submission, the shader 40 in the lowest stage of the pipeline processing generates enable flags for determining whether or not the respective pixels satisfy the branch conditions. The drawing processing apparatus 100 then exercises control so that the pixels having an enable flag of 1 are submitted to the branched passes and the pixels having an enable pixel of 0 are not. While the determinations as to if the pixels satisfy the branch conditions are made by the shader 40 in the lowest stage, it is more effective to exercise the pixel submission control on the branched passes in units of greater granularities in the upper pipeline stages.

Then, a flag generating part 70 provided for the shader 40 generates bind enable flags, or the enable flags of the pixels bound into the units of processing granularities at the respective pipeline stages. The bind enable flags are the logical sums of the enable flags of a plurality of pixels included in the respective units of processing in each pipeline stage. When viewed in the units of processing in each pipeline stage, the bind enable flags indicate whether or not to submit data in those units of processing. A bind enable flag is 1 if at least one of a plurality of pixels included in that unit of processing satisfies a branch condition. The bind enable flag is 0 if none of the pixels included in that unit of processing satisfies the branch condition.

The flag generating part 70 feeds back the bind enable flags to the arithmetic processing parts in the respective pipeline stages. The arithmetic processing parts in the respective pipeline stages submit the units of processing having a bind enable flag of 1 to the arithmetic processing of the branched passes, but not those having a bind enable flag of 0. Consequently, in the branched passes, the submission of data is controlled with the processing granularities of the respective pipeline stages.

In order to bind up the enable flags into the processing granularities of the respective pipeline stages, the flag generating part 70 requires information on delimiters that indicate divisions between the units of processing in the respective pipeline stages. For this purpose, each of the pipeline stages is provided with a mechanism for generating delimiters for indicating the divisions between the units of processing in the processing granularity of that pipeline stage. More specifically, the pipeline stages, or the primitive generating part 22, the raster part 26, the pixelation part 28, and the distribution part 30, are provided with a first delimiter sending part 61, a second delimiter sending part 62, a third delimiter sending part 63, and a fourth delimiter sending part 64, respectively. Delimiters indicating the divisions between the units of processing, or objects, primitives, raster lines, and stamps, are inserted into the stream data by the first delimiter sending part 61 to the fourth delimiter sending part 64, respectively.

The flag generating part 70 refers to the delimiters indicating the divisions between the units of processing including objects, primitives, raster lines, and stamps, and feeds back a bind enable flag F1 object by object (hereinafter, referred to as first bind enable flag F1), a bind enable flag F2 primitive by primitive (referred to as a second bind enable flag F2), a bind enable flag F3 raster line by raster line (referred to as a third bind enable flag F3), and a bind enable flag F4 stamp by stamp (referred to as a fourth bind enable flag F4) to the object input part 10, the primitive generating part 22, the raster part 26, and the pixelation part 28, respectively.

The pipeline stages are provided with respective buffers for buffering the bind enable flags fed back from the flag generating part 70 until execution of branched passes. That is, the primitive generating part 22, the raster part 26, and the pixelation part 28 are provided with a primitive flag buffer 81, a raster line flag buffer 82, and a stamp flag buffer 83, respectively. The object input part 10 also receives the first bind enable flag F1 fed back from the flag generating part 70. Nevertheless, the first bind enable flag F1 need not be buffered since it is intended to determine whether or not to submit object data to the next pass. The object input part 10 thus has no flag buffer.

The object input part 10, the primitive generating part 22, the raster part 26, and the pixelation part 28 determine whether or not to submit their processing units, i.e., objects, primitives, raster lines, and stamp to a branched pass by referring to the first bind enable flag F1 to the fourth bind enable flag F4, respectively.

Now, the mechanism how the first delimiter sending part 61 to the fourth delimiter sending part 64 generate the delimiters will be described first. Then, description will be given of the mechanism how the flag generating part 70 generates the bind enable flags.

Figure 3:
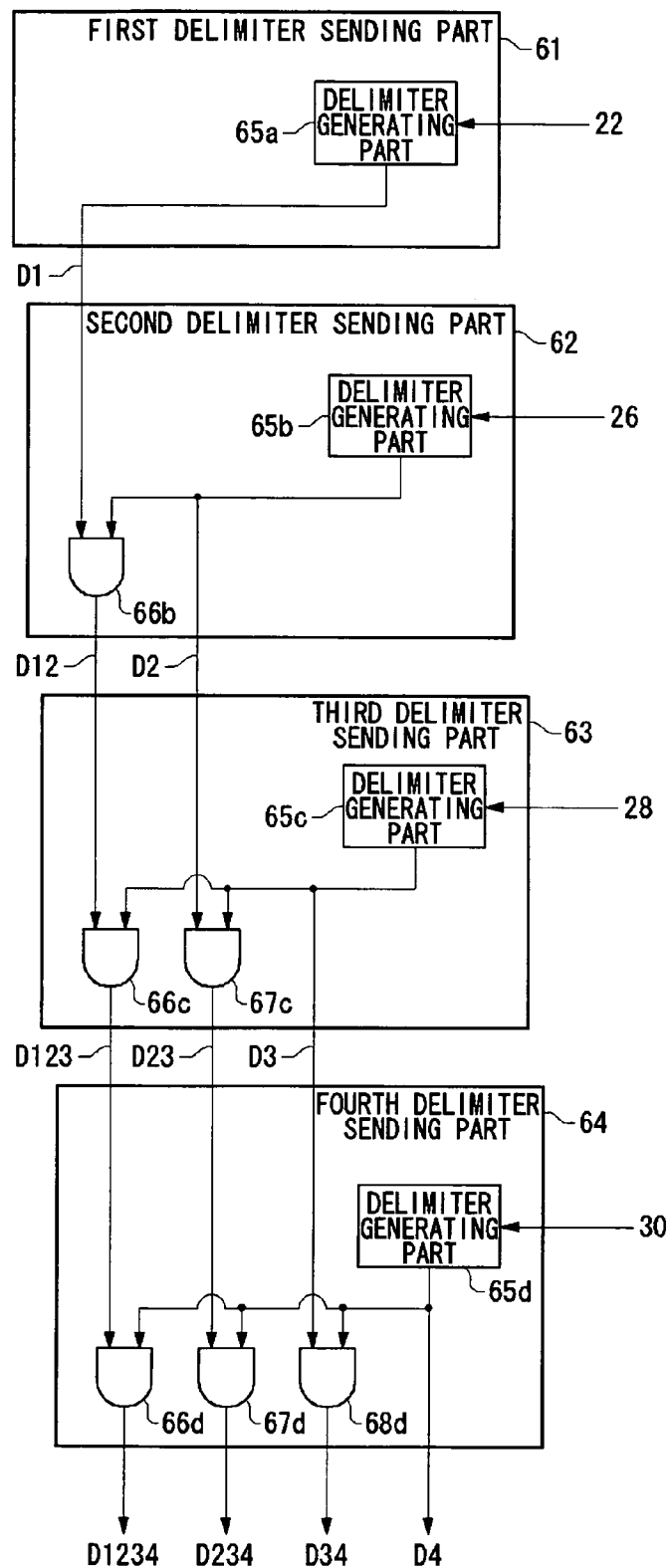
FIG. 3 is a diagram for explaining the configuration of delimiter sending parts of FIG. 1.
Figure 4:
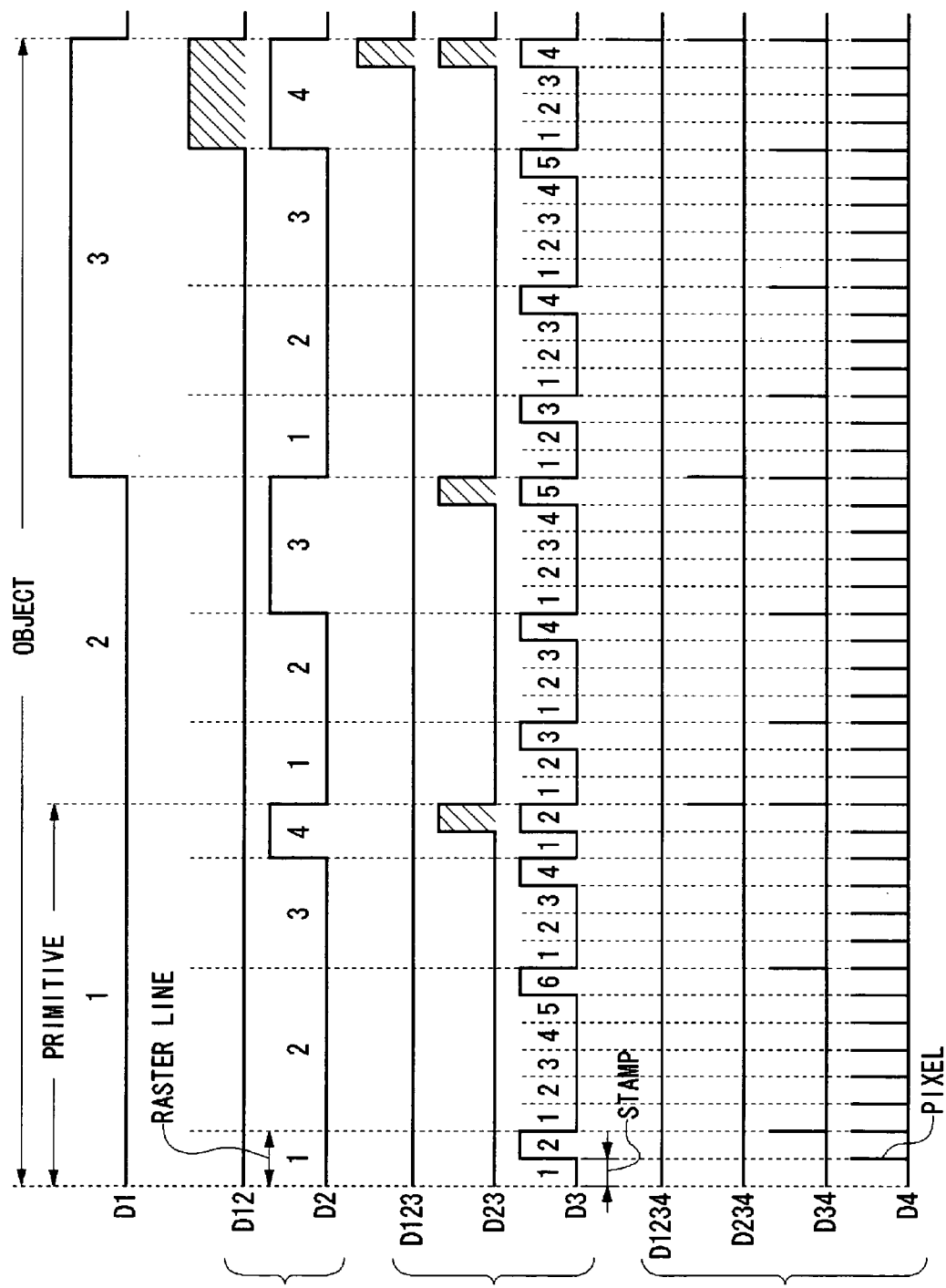
FIG. 4 is a diagram for showing how delimiters are generated by the delimiter sending parts of FIG. 3.

FIG. 3 is a diagram for explaining the configuration of the first delimiter sending part 61 to the fourth delimiter sending part 64. FIG. 4 is a diagram showing an example of how the delimiters are generated by the first delimiter sending part 61 to the fourth delimiter sending part 64. With reference to FIGS. 3 and 4, description will hereinafter be given of the configuration and operation of the first delimiter sending part 61 to the fourth delimiter sending part 64.

Initially, the configuration and operation of the first delimiter sending part 61 will be described. The primitive generating part 22 divides object data supplied from the object input part 10 in the prior stage into a plurality of primitives to generate a stream consisting of the plurality of primitives, and supplies it to the raster part 26 in the subsequent stage. The primitive generating part 22 instructs the first delimiter sending part 61 to output a first delimiter D1 at the timing when processing the last primitive of this stream as viewed divided object by object.

A delimiter generating part 65*a* of the first delimiter sending part 61 receives the signal for instructing to output the first delimiter D1 from the primitive generating part 22, and generates the first delimiter D1.

Referring to the example of FIG. 4, a single object consists of three primitives. The first delimiter D1 takes on a value of 0 at the timing of processing the first two primitives 1 and 2, and a value of 1 at the timing of processing the last primitive 3. The first delimiter D1 indicates the division between objects in the granularity of primitives. Incidentally, for convenience of explanation, FIG. 4 shows delimiters as if they are pulsed signals taking on values of 0 or 1. In fact, the delimiters are inserted into the stream data for transmission at the timing when they take on a value of 1.

The first delimiter sending part 61 sends the generated first delimiter D1 as part of the stream data on primitives, thereby transmitting it to the second delimiter sending part 62 in the subsequent stage. Consequently, the first delimiter D1 indicating the division between objects is inserted into the stream data on primitives which flows from the primitive generating part 22 to the raster part 26.

Next, the configuration and operation of the second delimiter sending part 62 will be described. The raster part 26 divides primitives supplied from the primitive generating part 22 in the prior stage into a plurality of raster lines to generate a stream consisting of the plurality of raster lines, and supplies it to the pixelation part 28 in the subsequent stage. The raster part 26 instructs the second limiter sending part 62 to output a second delimiter D2 at the timing when processing the last raster lines of this stream as viewed divided primitive by primitive.

A delimiter generating part 65*b* of the second delimiter sending part 62 receives the signal for instructing to output the second delimiter D2 from the raster part 26, and generates the second delimiter D2.

Referring to the example of FIG. 4, the primitive 1 consists of four raster lines 1 to 4, the primitive 2 three raster lines 1 to 3, and the primitive 3 four raster lines 1 to 4. The value of second delimiter D2 changes from 0 to 1 at the timing when processing the last raster lines of the respective primitives. The second delimiter D2 indicates the divisions between primitives in the granularity of raster lines.

The second delimiter sending part 62 sends the generated second delimiter D2 as part of the stream data on raster lines, thereby transmitting it to the third delimiter sending part 63 in the subsequent stage. Consequently, the second delimiter D2 indicating the divisions between primitives in the granularity of raster lines is inserted into the stream data on raster lines which flows from the raster part 26 to the pixelation part 28.

An AND circuit 66*b* of the second delimiter sending part 62 determines a logical product D12 between the first delimiter D1 input from the first delimiter sending part 61 in the prior stage and the second delimiter D2 generated by the delimiter generating part 65*b*.

Referring to the example of FIG. 4, the first delimiter D1 which shows the value of 1 for the last primitive 3 within the single object is converted, as shown shaded, into the first delimiter D12 which does not become 1 until the last raster line 4 in the last primitive 3. In this way, the first delimiter D1 is converted from the granularity of primitives into the granularity of raster lines, so that the converted first delimiter D12 indicates the division between objects in the granularity of raster lines.

The second delimiter sending part 62 sends the converted first delimiter D12 as part of the stream data on raster lines, thereby transmitting it to the third delimiter sending part 63 in the subsequent stage. Consequently, the first delimiter D12 indicating the division between objects in the granularity of raster lines is further inserted into the stream data on raster lines which flows from the raster part 26 to the pixelation part 28.

Next, the configuration and operation of the third delimiter sending part 63 will be described. The pixelation part 28 divides raster lines supplied from the raster part 26 in the prior stage into a plurality of stamps to generate a stream consisting of the plurality of stamps, and supplies it to the distribution part 30 in the subsequent stage. The pixelation part 28 instructs the third delimiter sending part 63 to output a third delimiter D3 at the timing when processing the last stamps of this stream as viewed divided raster line by raster line.

A delimiter generating part 65*c* of the third delimiter sending part 63 receives the signal for instructing to output the third delimiter D3 from the pixelation part 28, and generates the third delimiter D3.

Take, for example, the primitive 1 with reference to the example of FIG. 4. The raster line 1 consists of two stamps, the raster line 2 six stamps, the raster line 3 four stamps, and the raster line 4 two stamps. The third delimiter D3 changes from 0 to 1 at the timing when processing the last stamps of the respective raster lines. The third delimiter D3 indicates the divisions between raster lines in the granularity of stamps.

The third delimiter sending part 63 sends the generated third delimiter D3 as part of the stream data on stamps, thereby transmitting it to the fourth delimiter sending part 64 in the subsequent stage. Consequently, the third delimiter D3 indicating the divisions between raster lines in the granularity of stamps is inserted into the stream data on stamps which flows from the pixelation part 28 to the distribution part 30.

An AND circuit 66*c* of the third delimiter sending part 63 determines a logical product D123 between the first delimiter D12 input from the second delimiter sending part 62 in the prior stage and the third delimiter D3 generated by the delimiter generating part 65*c*. Besides, an AND circuit 67*c* determines a logical product D23 between the second delimiter D2 input from the second delimiter sending part 62 in the prior stage and the third delimiter D3 generated by the delimiter generating part 65*c*.

Referring to the example of FIG. 4, the first delimiter D12 and the second delimiter D2 are converted from the granularity of raster lines into the granularity of stamps as shown shaded. The converted first and second delimiters D123 and D23 indicate the divisions between objects and the divisions between primitives, respectively, in the granularity of stamps.

The third delimiter sending part 63 sends the converted first and second delimiters D123 and D23 as part of the stream data on stamps, thereby transmitting it to the fourth delimiter sending part 64 in the subsequent stage. Consequently, the first delimiter D123 indicating the divisions between objects in the granularity of stamps and the second delimiter D23 indicating the divisions between primitives in the granularity of stamps are further inserted into the stream data on stamps which flows from the pixelation part 28 to the distribution part 30.

Next, the configuration and operation of the fourth delimiter sending part 64 will be described. The distribution part 30 extracts a plurality of pixels included in the stamps supplied from the pixelation part 28 in the prior stage, and supplies a stream constituting the plurality of pixels to the shader 40 in the subsequent stage. The distribution part 30 instructs the fourth delimiter sending part 64 to output a fourth delimiter D4 at the timing when sending to the shader 40 the last pixels of this stream as viewed divided stamp by stamp.

A delimiter generating part 65*d* of the fourth delimiter sending part 64 receives the signal for instructing to output the fourth delimiter D4 from the distribution part 30, and generates the fourth delimiter D4.

Referring to the example of FIG. 4, the fourth delimiter D4 changes from 0 to 1 at timing for sending the last pixels of the respective stamps, as shown by the pulses of the narrowest width in the diagram.

The fourth delimiter sending part 64 sends the generated fourth delimiter D4 as part of the stream data on pixels, thereby transmitting it to the flag generating part 70 in the subsequent stage. Consequently, the fourth delimiter D4 indicating the divisions between stamps in the granularity of pixels is inserted into the stream data on stamps which flows from the distribution part 30 to the shader 40.

An AND circuit 66d of the fourth delimiter sending part 64 determines a logical product D1234 between the first delimiter D123 input from the third delimiter sending part 63 in the prior stage and the fourth delimiter D4 generated by the delimiter generating part 65d. An AND circuit 67d determines a logical product D234 between the second delimiter D23 input from the third delimiter sending part 63 in the prior stage and the fourth delimiter D4 generated by the delimiter generating part 65d. Moreover, an AND circuit 68d determines a logical product D34 between the third delimiter D3 input from the third delimiter sending part 63 in the prior stage and the fourth delimiter D4 generated by the delimiter generating part 65d.

Referring to the example of FIG. 4, the first delimiter D123, the second delimiter D23, and the third delimiter D3 are converted from the granularity of stamps into the granularity of pixels. The converted first, second, and third delimiters D1234, D234, and D34 indicate the division between objects, the divisions between primitives, and the divisions between raster lines, respectively, in the granularity of pixels.

The fourth delimiter sending part 64 sends the converted first, second, and third delimiters D1234, D234, and D34 as part of the stream data on pixels, thereby transmitting it to the flag generating part 70 in the subsequent stage. Consequently, the first delimiter D1234 indicating the division between objects in the granularity of pixels, the second delimiter D234 indicating the divisions between primitives in the granularity of pixels, and the third delimiter D34 indicating the divisions between raster lines in the granularity of pixels are further inserted into the stream data on pixels which flows from the distribution part 30 to the shader 40.

Incidentally, for convenience of explanation, FIG. 1 shows the routes of the delimiters flowing from the first delimiter sending part 61, the second delimiter sending part 62, the third delimiter sending part 63, and the fourth delimiter sending part 64 to the flag generating part 70 as being separate from the route of the drawing processing data which flows the pipeline from the object input part 10 to the shader 40 via the components of the rasterizer 20 and the distribution part 30. In fact, the delimiters flow the pipeline together with the drawing processing data.

Figure 5:
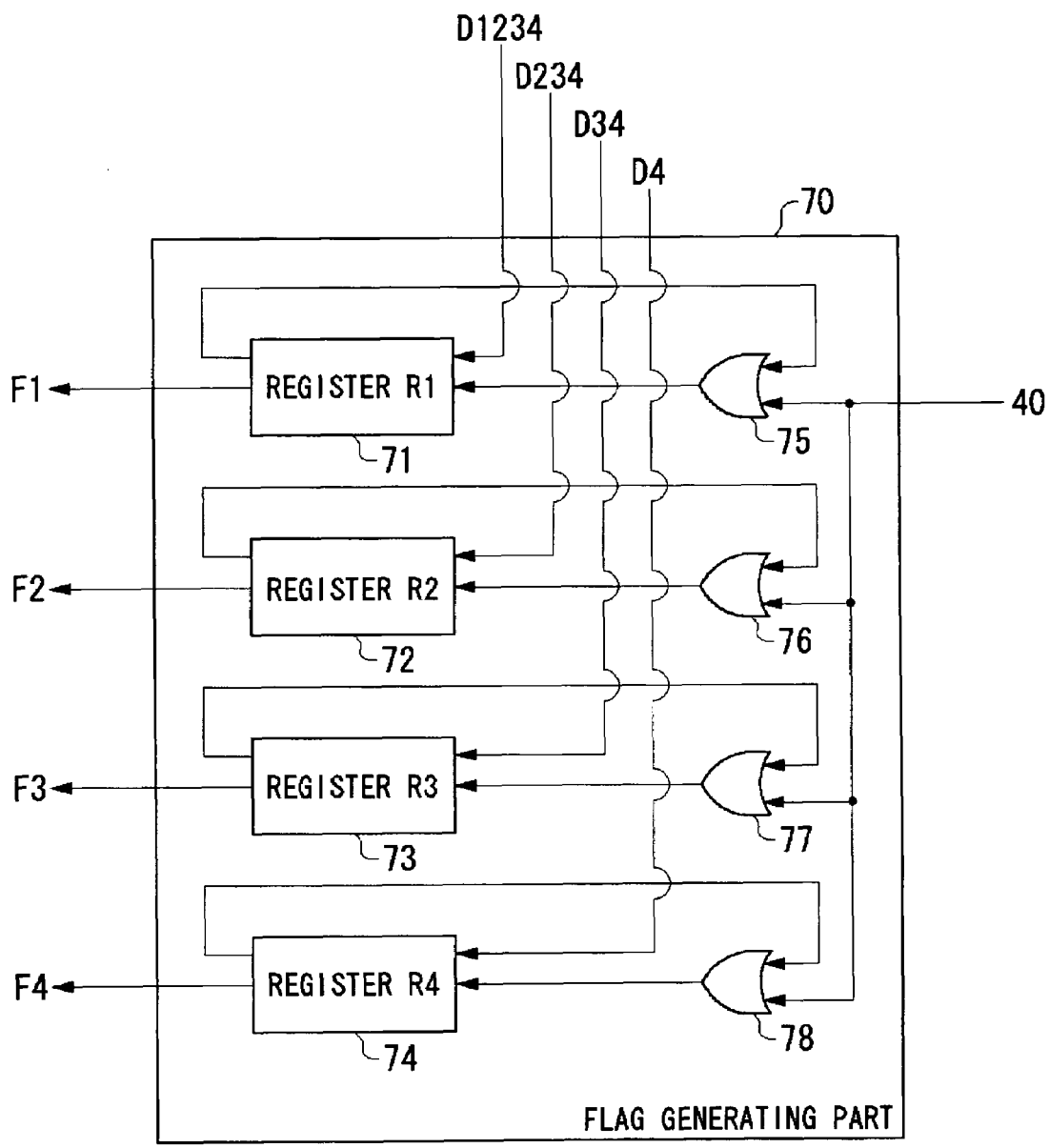
FIG. 5 is a diagram for explaining the configuration of a flag generating part of FIG. 1.

FIG. 5 is a diagram for explaining the configuration of the flag generating part 70. The flag generating part 70 receives the input of the first delimiter D1234, the second delimiter D234, the third delimiter D34, and the fourth delimiter D4 from the fourth delimiter sending part 64, and receives the input of the enable flags on the respective pixels from the shader 40. The flag generating part 70 has four registers R1 to R4 (reference numerals 71 to 74), and four OR circuits 75 to 78.

The first delimiter D1234, the second delimiter D234, the third delimiter D34, and the fourth delimiter D4 indicate the divisions between the units of processing, or objects, primitives, raster lines, and stamps, in the stream data in the granularity of pixels, respectively. By referring to these delimiters, the flag generating part 70 generates the first to fourth bind enable flags F1 to F4 which are a string of enable flags on the plurality of pixels, bound in accordance with the divisions in the units of processing, i.e., objects, primitives, raster lines, and stamps, respectively.

The first register R1 holds the value of the first bind enable flag F1. The value held in the first register R1 is fed back and input to the first OR circuit 75. The first OR circuit 75 calculates a logical sum between the feedback input value of the first register R1 and the enable flag on each pixel input from the shader 40, and writes the result to the first register R1. When the first delimiter D1234 input to the first R1 has a value of 1, the value of the first bind enable flag F1 held in the first register R1 is output and the value of the first register R1 is reset to 0.

By the operation of the first OR circuit 75, if once the pixel enable flag having a value of 1 is input from the shader 40 and the value of 1 is written to the first register R1, the value of the first register R1 is held at 1 until reset by the first delimiter D1234. Consequently, the first bind enable flag F1 stored in the first register R1 shows the OR calculation on a bit string of pixel-by-pixel enable flags divided by the first delimiter D1234.

In other words, if any of the pixels in an object satisfies the branch condition, the first bind enable flag F1 is 1. If none of the pixels in the object satisfies the branch condition, the first bind enable flag F1 is 0.

The second bind enable flag F2 is generated by the second register R2 and the second OR circuit 76 through the same mechanism. The second bind enable flag F2 stored in the second register R2 shows the OR calculation on a string of pixel-by-pixel enable flags divided by the second delimiter D234. More specifically, if any of the pixels in a primitive satisfies the branch condition, the second bind enable flag F2 is 1. If none of the pixels in the primitive satisfies the branch condition, the second bind enable flag F2 is 0.

Similarly, the third bind enable flag F3 stored in the third register R3 shows the OR calculation on a string of pixel-by-pixel enable flags divided by the third delimiter D34. If any of the pixels in a raster line satisfies the branch condition, the third bind enable flag F3 is 1. If none of the pixels in the raster line satisfies the branch condition, the third bind enable flag F3 is 0.

The fourth bind enable flag F4 stored in the fourth register R4 shows the OR calculation on a string of pixel-by-pixel enable flags divided by the fourth delimiter D4. If any of the pixels in a stamp satisfies the branch condition, the fourth bind enable flag F4 is 1. If none of the pixels in the stamp satisfies the branch condition, the fourth bind enable flag F4 is 0.

When the first delimiter D1234 is 1, the flag generating part 70 feeds back the first bind enable flag F1 output from the first register R1 to the object input part 10. The object input part 10 submits the object to the branched pass if the first bind enable flag F1 is 1, and does not submit the object if the first bind enable flag F1 is 0. This makes it possible to control the submission of data in units of objects, so that objects are prevented from rasterization unless they contain any pixel to be processed in the branched pass.

Moreover, when the second delimiter D234 is 1, the flag generating part 70 feeds back the second bind enable flag F2 output from the second register R2 to the primitive flag buffer 81 provided for the primitive generating part 22. The primitive flag buffer 81 holds the second bind enable flag F2 primitive by primitive.

The primitive generating part 22 refers to the second bind enable flag F2 stored in the primitive flag buffer 81 with respect to each primitive. In the branched pass, the primitive generating part 22 skips primitives if their second bind enable flags F2 are 0, and processes primitives only if their second bind enable flags F2 are 1. This makes it possible to control the submission of data in units of primitives, so that primitives are prevented from rasterization unless they contain any pixel to be processed in the branched pass.

When the third delimiter D34 is 1, the flag generating part 70 feeds back the third bind enable flag F3 output from the third register R3 to the raster line flag buffer 82 provided for the raster part 26. The raster line flag buffer 82 holds the third bind enable flag F3 raster line by raster line.

The raster part 26 refers to the third bind enable flag F3 stored in the raster line flag buffer 82 with respect to each raster line. In the branched pass, the raster part 26 skips raster lines if their third bind enable flags F3 are 0, and processes raster lines only if their third bind enable flags F3 are 1. This makes it possible to control the submission of data in units of raster lines, so that raster lines are prevented from rasterization unless they contain any pixel to be processed in the branched pass.

When the fourth delimiter D4 is 1, the flag generating part 70 feeds back the fourth bind enable flag F4 output from the fourth register R4 to the stamp flag buffer 83 provided for the pixelation part 28. The stamp flag buffer 83 stores the fourth bind enable flag F3 stamp by stamp.

The pixelation part 28 refers to the fourth bind enable flag F4 stored in the stamp flag buffer 83 with respect to each stamp. In the branched pass, the pixelation part 28 skips stamps if their fourth bind enable flags F4 are 0, and processes stamps only if their fourth bind enable flags F4 are 1. This makes it possible to control the submission of data in units of stamps, so that stamps are prevented from rasterization unless they contain any pixel to be processed in the branched pass.

Figure 6:
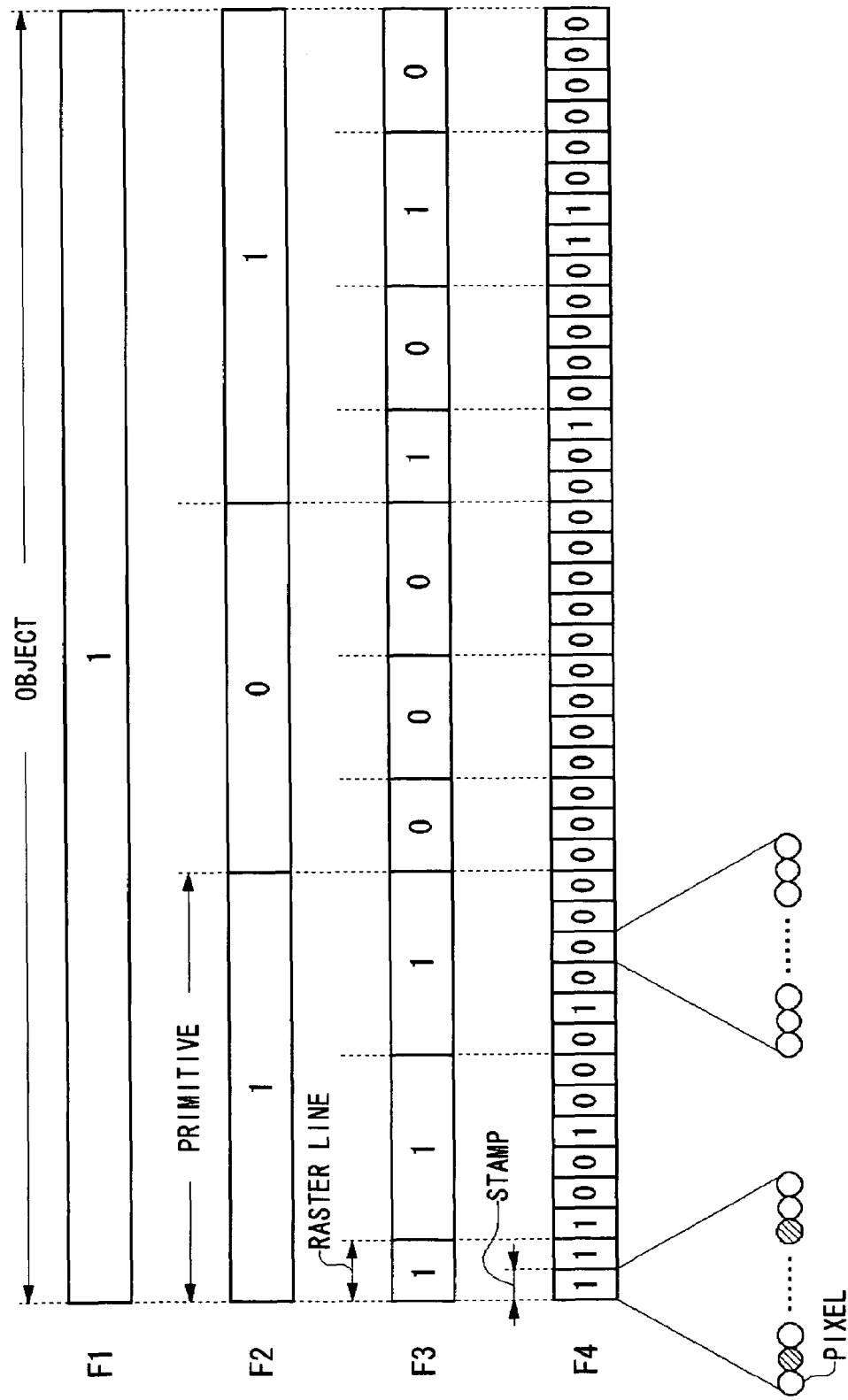
FIG. 6 is a diagram for explaining bind enable flags to be generated by the flag generating part of FIG. 5.

FIG. 6 is a diagram for explaining the first bind enable flag F1 to the fourth bind enable flag F4 generated by the flag generating part 70. The fourth bind enable flag F4 is 1 if any of the pixels constituting a stamp has an enable flag of 1. In the diagram, the circles represent pixels whose enable flags are 0, and the shaded circles represent pixels whose enable flags are 1. The bit string showing the values of the fourth bind enable flags F4 on the respective stamps is buffered into the stamp flag buffer 83.

The third bind enable flag F3 is the fourth bind enable flags F4 bound in units of raster lines.

If any one of the stamps in a raster line has a fourth bind enable flag F4 of 1, the third bind enable flag F3 on that raster line is 1. When all the stamps in a stamp have a fourth bind enable flag F4 of 0, the third bind enable flag F3 on that raster line is 0. The bit string showing the values of the third bind enable flags F3 on the respective raster lines is buffered into the raster line flag buffer 82.

The second bind enable flag F2 is the third bind enable flags F3 bound in units of primitives. If any one of the raster lines in a primitive has a third bind enable flag F3 of 1, the second bind enable flag F2 on that primitive is 1. When all the raster lines in a primitive have a third bind enable flag F3 of 0, the second bind enable flag F2 on that primitive is 0. The bit string showing the values of the second bind enable flags F2 on the respective primitives is buffered into the primitive flag buffer 81.

The first bind enable flag F1 is the second bind enable flags F2 bound in units of objects. If any one of the primitives in an object has a second bind enable flag F2 of 1, the first bind enable flag F1 on that object is 1. When all the primitives in an object have a second bind enable flag F2 of 0, the first bind enable flag F1 on that object is 0.

Figure 7:
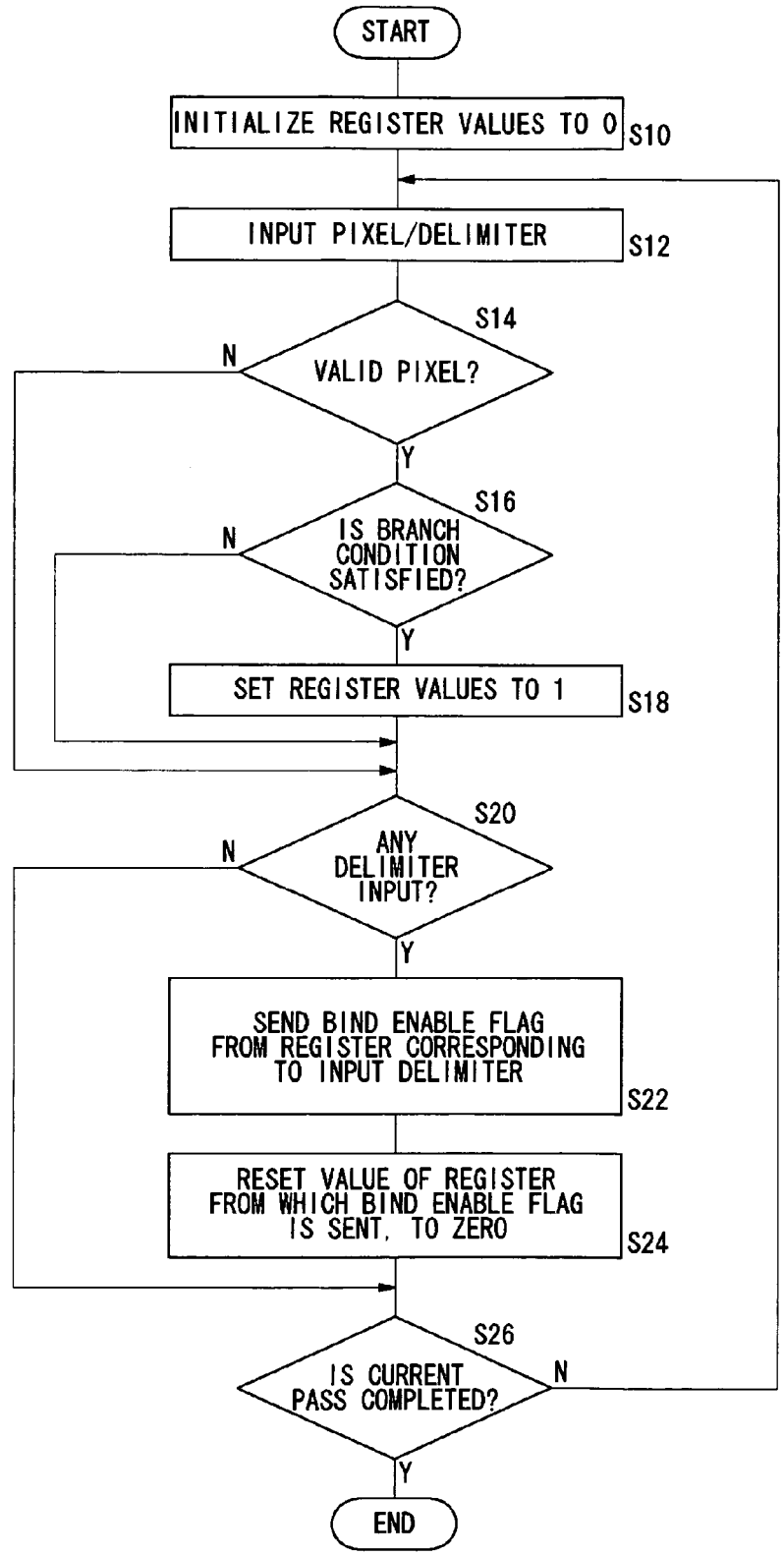
FIG. 7 is a flowchart showing the steps by which the flag generating part of FIG. 5 generates the bind enable flags.

FIG. 7 is a flowchart showing the steps by which the flag generating part 70 generates the bind enable flags.

The values of the first register R1 to the fourth register R4 of the flag generating part 70 are initialized to zero (S10).

Pixels are input to the shader 40 in succession. Here, if a pixel in question is followed by any of the first delimiter D1234, the second delimiter D234, the third delimiter D34, and the fourth delimiter D4, that delimiter is also input (S12).

Primitives are rasterized in units of stamps. Stamps falling on primitive borders contain both valid pixels pertaining to inside the primitives and invalid pixels pertaining to outside the primitives. The shader 40 checks whether the input pixel is valid or not (S14). Whether the pixels are valid or not is determined in advance when rasterized in units of stamps, and the flags for valid/invalid distinction are given to the respective pixels. The shader 40 refers to the flag, and moves the processing to step S16 if the pixel is valid (Y at S14). If the pixel is invalid (N at S14), it moves the processing to step S20.

The shader 40 checks whether or not the input pixel satisfies a branch condition (S16). If the pixel satisfies the branch condition (Y at S16), the shader 40 sets the enable flag to 1, and supplies the enable flag of the pixel to the flag generating part 70. Since the enable signal is 1, the flag generating part 70 sets the values of the first register R1 to the fourth register R4 to 1 (S18).

If the pixel does not satisfy the branch condition (N at S16), the shader 40 resets the enable flag to 0, and supplies the enable flag of the pixel to the flag generating part 70. Since the enable signal is 0, the flag generating part 70 moves the processing to step S20 without setting the values of the first register R1 to the fourth register R4 to 1.

If any of the first delimiter D1234, the second delimiter D234, the third delimiter D34, and the fourth delimiter D4 is/are input (Y at S20), the flag generating part 70 sends the bind enable flag(s) held in the register(s) corresponding to the input delimiter(s), out of the first register R1 to the fourth register R4, to the corresponding pipeline stage(s). The flag generating part 70 resets the value(s) of the register(s) from which the bind enable flag(s) is/are sent, to zero (S24).

If the pass currently in process completes (Y at S26), the series of processing ends. If the pass currently in process is yet to complete (N at S26), the flag generating part 70 returns to step S12 to process the next pixel.

Now, with reference to FIGS. 8A to 9C, description will be given of how the submission of data to a branched pass is controlled by the drawing processing apparatus 100.

FIGS. 8A to 8D are diagrams for explaining how the rasterizer 20 rasterizes a primitive and the shader 40 makes determinations on the branch condition pixel by pixel.

Figure 8B:
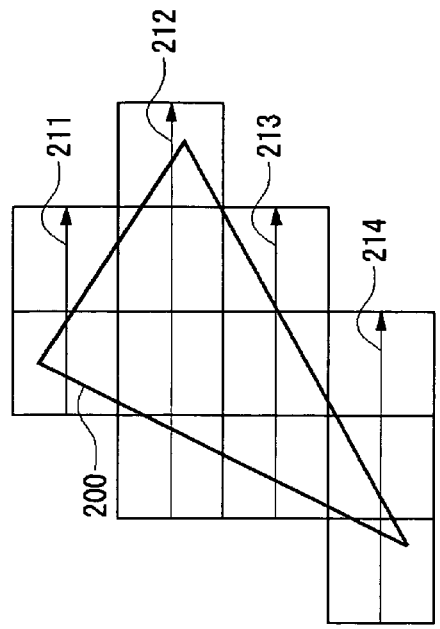
FIGS. 8A to 8D are diagrams for explaining how the rasterizer of FIG. 1 rasterizes a primitive and the shader makes determinations on a branch condition pixel by pixel.
Figure 8D:
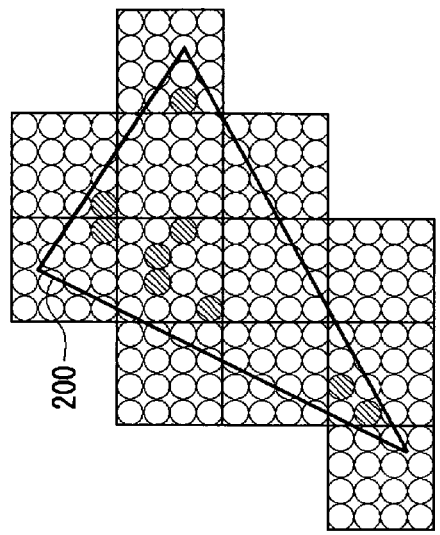
Figure 8A:
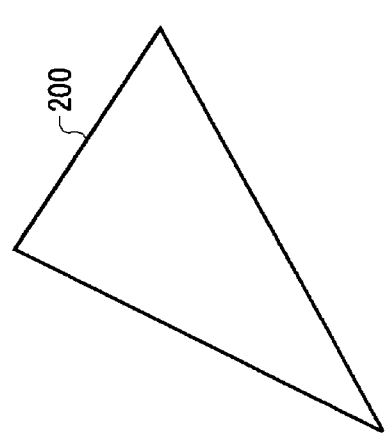
Figure 8C:
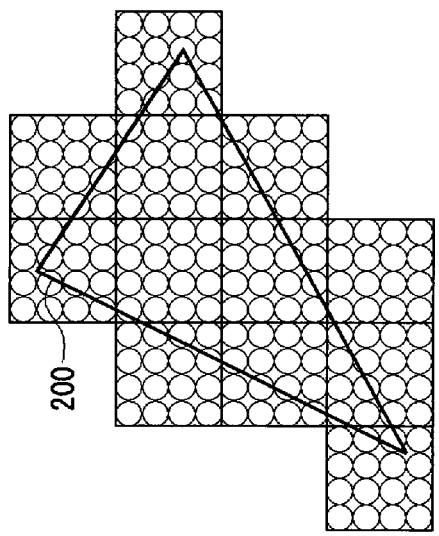

FIG. 8A shows a primitive 200 which is supplied from the primitive generating part 22 to the DDA 24 in the rasterizer 20. The raster part 26 of the DDA 24 divides the primitive 200 into a first raster line 211 to a fourth raster line 214 in the horizontal direction as shown in FIG. 8B. The pixelation part 28 divides each of the raster lines 214 to 214 into stamps, and pixelates the stamps as shown in FIG. 8C. Here, the stamps have a size of 4×4 pixels each. The pixelation part 28 converts each stamp into 16 pixels.

The shader 40 checks whether or not each of the pixels satisfies the branch condition. FIG. 8D shows the results of determination on the branch condition made by the shader 40. The shaded pixels satisfy the branch condition, and are targeted for arithmetic processing in the branched pass.

In FIG. 8D, none of the stamps in the third raster line 213 contains any pixel that satisfies the branch condition. The third raster line 213 thus need not be submitted to the branched pass. The third bind enable flag F3 on the third raster line 213 is reset to 0, so that the third raster line 213 is disabled in the branched pass.

The second raster line 212 and the fourth raster line 214 include both stamps that contain at least one pixel satisfying the branch condition and stamps that do not contain any pixel satisfying the branch condition. The stamps that do not contain any pixel satisfying the branch condition need not be submitted to the branched pass. The fourth bind enable flags F4 on the stamps are reset to 0 so that those stamps are disabled in the branched pass.

Figure 9B:
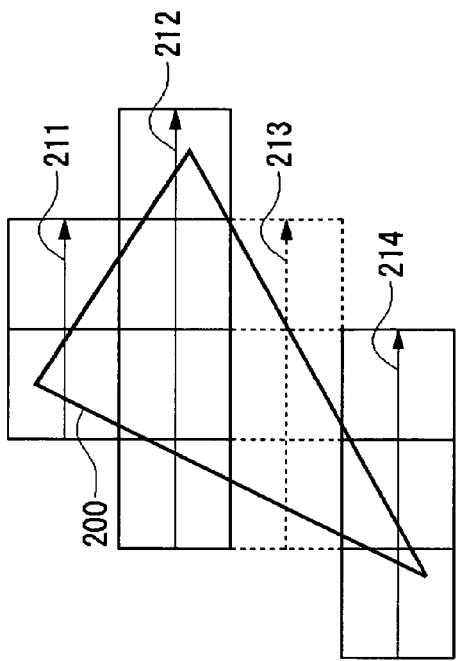
FIGS. 9A to 9C are diagrams for explaining the processing of the rasterizer of FIG. 1 in the branched pass.
Figure 9A:
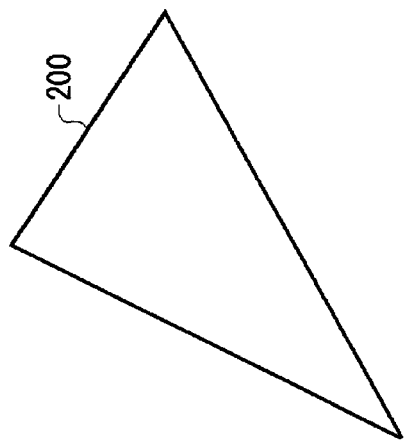
Figure 9C:
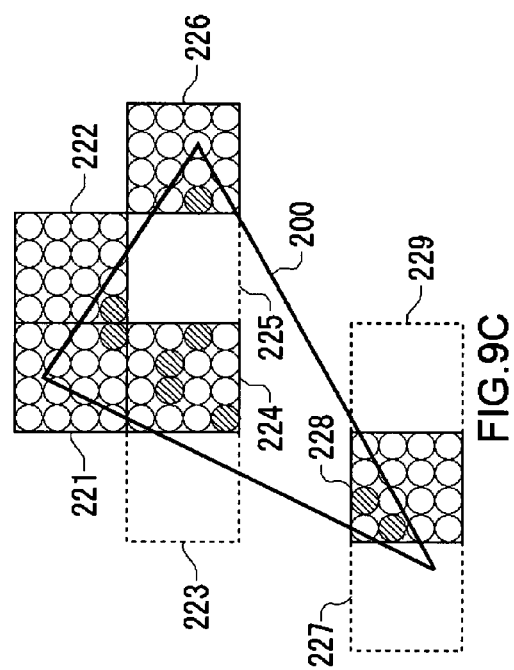

FIGS. 9A to 9C are diagrams for explaining the processing of the rasterizer 20 in the branched pass.

FIG. 9A shows the same primitive 200 as in FIG. 8A, which is supplied from the primitive generating part 22 to the DDA 24 in the branched pass. The raster part 26 of the DDA 24 refers to the third bind enable flags F3, and divides the primitive 200 into the first raster line 211, the second raster line 212, and the fourth raster line 214 as shown in FIG. 9B. The third raster line 213 is not generated since it is disabled by its third bind flag F3.

The pixelation part 28 refers to the fourth bind enable flags F4, and divides the first raster line 211, the second raster line 212, and the fourth raster line 214 into stamps, and pixelates the stamps as shown in FIG. 9C.

Two stamps 221 and 222 that constitute the first raster line 211 are both pixelated. Among four stamps 223 to 226 that constitute the second raster line 212, the two stamps 223 and 225 disabled by their fourth bind enable flags F4 are not generated while only the remaining two stamps 224 and 226 enabled by their fourth bind enable flags F4 are generated. Among three stamps 227 to 229 that constitute the fourth raster line 214, the two stamps 227 and 229 disabled by their fourth bind enable flags F4 are not generated while only the remaining one stamp 228 enabled by its fourth bind enable flag F4 is generated.

Now, with reference to FIGS. 10A to 11G, description will be given of how the submission of data on a plurality of primitives constituting an object to a branched pass is controlled.

Suppose that an object consists of a first primitive 200, a second primitive 201, and a third primitive 202 shown in FIGS. 10A, 10E, and 10I, respectively. The primitive generating part 22 supplies the first to third primitives 200 to 202 to the DDA 24 in succession as stream data.

FIGS. 10A to 10D show how the first primitive 200 is rasterized, and determinations on a branch condition are made pixel by pixel. The rasterizer 20 divides the first primitive 200 into four raster lines (FIG. 10B). The individual raster lines are divided into stamps and pixelated (FIG. 10C). The shader 40 makes determinations on the branch condition pixel by pixel (FIG. 10D). For the sake of simplicity, in the diagram, stamps that contain at least one pixel satisfying the branch condition are shown shaded while stamps that do not contain any pixel satisfying the branch condition are unshaded. In the third raster line of the first primitive 200, none of the stamps contains any pixel satisfying the branch condition. The third bind enable flag F3 is thus reset to 0. In the second and fourth raster lines, the fourth bind enable flags F4 only on the stamps that do not contain any pixel satisfying the branch condition are reset to 0.

Similarly, FIGS. 10E to 10H show how the second primitive 201 is rasterized, and determinations on the branch condition are made pixel by pixel. The rasterizer 20 divides the second primitive 201 into four raster lines (FIG. 10F). The individual raster lines are divided into stamps and pixelated (FIG. 10G). The shader 40 makes determinations on the branch condition pixel by pixel. None of the stamps of the second primitive 201 contains any pixel that satisfies the branch condition (FIG. 10H). The second bind enable flag F2 on the second primitive 201 is reset to 0.

FIGS. 10I to 10L show how the third primitive 202 is rasterized, and determinations on the branch condition are made pixel by pixel. The third primitive 202 is divided into four raster lines (FIG. 10I). The individual raster lines are divided into stamps and pixelated (FIG. 10K), and determinations on the branch condition are made pixel by pixel (FIG. 10L). The third bind enable flags F3 on all the raster lines of the third primitive 202 are set to 1. In each raster line, the fourth bind enable flags F4 only on those stamps that do not contain any pixel satisfying the branch condition are reset to 0.

FIGS. 11A to 11G are diagrams for explaining the processing of the rasterizer 20 in the branched pass.

FIGS. 11A, 11D, and 11E show the first primitive 200, the second primitive 201, and the third primitive 202 which are the same as in FIGS. 10A, 10E, and 10I, respectively. In the branched pass, the primitive generating part 22 skips the second primitive 201 without submitting it to the processing. The reason is that the second primitive 201 is disabled by its second bind enable flag F2.

For the first primitive 200, as shown in FIG. 11B, the second raster line disabled by its third bind enable flag F3 is skipped while the first, second, and fourth raster lines alone are generated. Moreover, as shown in FIG. 11C, the stamps disabled by their fourth bind enable flags F4 are skipped while only the stamps enabled by their fourth bind enable flags F4 are generated.

Similarly, for the third primitive 202, the first to fourth raster lines are generated as shown in FIG. 11F. In each of the raster lines, as shown in FIG. 11G, the stamps disabled by their fourth bind enable flag F4 are skipped while only the stamps enabled by their fourth bind enable flag F4 are generated.

As has been described, according to the present embodiment, when the drawing processing program for multipass rendering has conditional branches, pixels satisfying the branch conditions are determined. This makes it possible to limit the submission of data not targeted for arithmetic processing with the processing granularities of upper pipeline stages when executing the branched passes. In rendering pipelines, going into the pipeline stages downstream can cause data retention and make the processing heavier because the data granularities become finer and the amounts of data become greater. Since the submission of the units of processing not satisfying the branch conditions is controlled at pipeline stages as high as possible, the processing efficiency can be improved. In particular, if the submission of data can be cut off before the amount of data starts to increase, i.e., in the granularities of primitives or objects before pixelation, the processing overhead can be reduced significantly. This makes it possible for even a drawing processing program having a lot of conditional branches and high complexity to be performed efficiently by multipass rendering.

According to the present embodiment, when multipass rendering is performed by using the pipeline mechanism, it is possible to process a pass while making determinations whether or not the individual pixels are to be processed in subsequent passes. The results of determination are then bound into different granularities of processing, and fed back to different pipeline stages so that they are reflected on the execution of the subsequent passes. This allows control on program execution in finer granularities. As a result, it is possible to improve the controllability of the multipass rendering and enhance the programming flexibility.

Up to this point, the present invention has been described in conjunction with the embodiment thereof. The foregoing embodiment has been given solely by way of illustration. It will be understood by those skilled in the art that various modifications may be made to combinations of the foregoing components and processes, and all such modifications are also intended to fall within the scope of the present invention. Such modifications will be described below.

The foregoing description has dealt with the case where the bind enable flags are generated and buffered in the pipeline stages as the information for determining whether or not to submit the units of processing in the respective pipeline stages to a branched pass. The bind enable flags may be generated as to a plurality of branched passes and buffered in the pipeline stages, however, since determinations sometimes involve whether or not the pixels are targeted for arithmetic processing in a plurality of subsequent branched passes.

The foregoing description has also dealt with the case where the drawing processing program is divided into the plurality of passes depending on the conditional branches. Nevertheless, the pass division of the drawing processing program need not necessarily be based on conditional branches. The program may be divided into passes depending on other standards as well. For example, code strings that include loops may be used as the units of pass division. While the shader has determined whether or not the pixels are to be processed in subsequent passes depending on if the pixels satisfy the respective branch conditions, the determinations need not necessarily be based on branch conditions. Whether or not pixels are to be processed in subsequent passes may be determined from other criteria as well. For example, whether or not pixels are to be processed in subsequent passes may be determined depending on if the pixels fall within the ranges of reference from the code strings of the program.

What is claimed is:

1. A drawing processing apparatus for performing multipass rendering in which drawing processing on a drawing object is divided into and processed in a plurality of operation passes, comprising:
  a pipeline processing mechanism having a plurality of arithmetic processing parts which process the drawing object in units of processing of respective different granularities, the arithmetic processing parts constituting a plurality of pipeline stages in descending order of processing granularities,
  wherein at least one of the arithmetic processing parts includes a delimiter sending part that (a) generates delimiters indicating the divisions between the units of processing of the arithmetic processing part at the prior stage in the granularity of the unit of processing of the current arithmetic processing part and sends the generated delimiters to the delimiter sending part of the subsequent arithmetic processing part, and (b) changes the granularity of the delimiters received from the delimiter sending part at the prior stage and sends the delimiters to the delimiter sending unit of the arithmetic processing part of the subsequent stage,
  wherein the arithmetic processing part at the final stage
    (a) generates determination flags for determining, in the processing granularity of the arithmetic processing part at the final stage, whether or not the respective units of processing are targeted for arithmetic processing in a subsequent operation pass;
    (b) binds up the determination flags based on the delimiters indicating the divisions of units of processing at respective stages, thereby generating bind flags for indicating, in the processing granularities of the arithmetic processing parts in the respective stages, whether or not the individual units of processing are targeted for arithmetic processing in a subsequent operation pass; and
    (c) supplies the bind flags to the arithmetic processing parts in the respective stages; and
  each of the arithmetic processing parts: acquires the bind flag bound into the processing granularity of that arithmetic processing part, and in the subsequent operation pass, performs the arithmetic processing on only the unit of processing targeted for the arithmetic processing with reference to the flag, and supplies data resulting from the arithmetic processing to the arithmetic processing part in the subsequent stage.

2. The drawing processing apparatus according to claim 1, wherein:
  the drawing processing is divided into a plurality of operation passes for respective conditional branches of a drawing program to be performed on the drawing object; and
  the arithmetic processing part at the final stage determines, in the processing granularity of the arithmetic processing part at the final stage, whether or not the individual units of processing are targeted for arithmetic processing in subsequent branched operation passes depending on if the units of processing satisfy conditions of the respective conditional branches in the processing granularity of the arithmetic processing part at the final stage.

3. A drawing processing apparatus for performing multipass rendering in which drawing processing on a drawing object is divided into and processed in a plurality of operation passes, comprising:
  a rasterizer which rasterizes the drawing object to generate pixel data; and
  a pixel processing part which performs arithmetic processing on the pixel data generated by the rasterizer,
  wherein the rasterizer includes a pipeline processing mechanism having a plurality of arithmetic processing parts which process the drawing object in units of processing of respective different granularities, the arithmetic processing parts constituting a plurality of pipeline stages in descending order of processing granularities; and
  at least one of the arithmetic processing parts includes a delimiter sending part that (a) generates delimiters indicating the divisions between the units of processing of the arithmetic processing part at the prior stage in the granularity of the unit of processing of the current arithmetic processing part and sends the generated delimiters to the delimiter sending part of the subsequent arithmetic processing part, and (b) changes the granularity of the delimiters received from the delimiter sending part at the prior stage and sends the delimiters to the delimiter sending unit of the arithmetic processing part of the subsequent stage,
  the pixel processing part has a flag generating part which
    (a) generates determination flags for determining whether or not the respective pixels are targeted for arithmetic processing in a subsequent operation pass,
    (b) binds up the determination flags based on the delimiters indicating the divisions of units of processing at respective stages, thereby generating bind flags for indicating, in the processing granularities of the arithmetic processing parts in the respective stages, whether or not the individual units of processing are targeted for arithmetic processing in a subsequent operation pass, and (c) supplies the bind flags to the arithmetic processing parts in the respective stages.

4. The drawing processing apparatus according to claim 3, wherein in the subsequent operation pass, the rasterizer only generates pixels targeted for arithmetic processing with reference to the bind flags, and supplies the generated pixel data to the pixel processing part.

5. The drawing processing apparatus according to claim 4, wherein:

the drawing processing is divided into a plurality of operation passes for respective conditional branches of a drawing program to be performed on the drawing object; and the flag generating part determines whether or not the individual pixels are targeted for arithmetic processing in subsequent branched operation passes depending on if the pixels satisfy conditions of the respective conditional branches.

6. The drawing processing apparatus according to claim 3, wherein:

the drawing processing is divided into a plurality of operation passes for respective conditional branches of a drawing program to be performed on the drawing object; and the flag generating part determines whether or not the individual pixels are targeted for arithmetic processing in subsequent branched operation passes depending on if the pixels satisfy conditions of the respective conditional branches.

7. The drawing processing apparatus according to claim 3, wherein:

the rasterizer includes a primitive generating part which generates data on one or more drawing primitives constituting the drawing object; and the flag generating part binds up the determination flags determined pixel by pixel into units of the drawing primitives, thereby generating bind flags for indicating whether or not the units of the drawing primitives are targeted for arithmetic processing in a subsequent operation pass, and supplies the bind flags to the primitive generating part.

8. The drawing processing apparatus according to claim 7, wherein:

the rasterizer further includes a digital differential analysis part which converts the drawing primitive into pixel data with respect to each scan line through digital differential analysis processing; and the flag generating part binds up the determination flags determined pixel by pixel into units of the digital differential analysis processing, thereby generating bind flags for indicating whether or not the units of the digital differential analysis processing are targeted for arithmetic processing in a subsequent operation pass, and supplies the bind flags to the digital differential analysis part.

9. A drawing processing method for multipass rendering, the method comprising the steps of:

dividing and performing drawing processing in a plurality of operation passes, in each pipeline stage of a pipeline processing mechanism having a plurality of pipeline stages for processing the drawing object in units of processing of respective different granularities, the pipeline stages being connected in descending order of processing granularity, a) generating delimiters indicating the divisions between the units of processing of the prior stage in the granularity of the unit of processing of the current stage and sending the generated delimiters to the delimiter sending part of the subsequent arithmetic processing part, and (b) changing the granularity of the delimiters received from the delimiter sending part at the prior stage and sending the delimiters to the delimiter sending unit of the subsequent stage, in a final pipeline stage of the pipeline processing mechanism (a) generating determination flags for determining, in the processing granularity of the final pipeline stage, whether or not the respective units of processing are targeted for arithmetic processing in a subsequent operation pass;

(b) binding up the determination flags based on the delimiters indicating the divisions of units of processing at respective stages, thereby generating bind flags for determining, in the processing granularities of the respective pipeline stages, whether or not the individual units of processing are targeted for arithmetic processing in a subsequent operation pass, and (c) feeding back the bind flags to the pipeline stages; and in the subsequent arithmetic pass, the pipeline stages performing arithmetic processing only on the units of processing targeted for arithmetic processing with reference to the flags fed back, and supplying data resulting from the arithmetic processing to the respective subsequent pipeline stages.

10. A drawing processing method for multipass rendering in which drawing processing on a drawing object is divided into and processed in a plurality of operation passes, the method comprising:

utilizing a pipeline processing mechanism having a plurality of pipeline stages for processing the drawing object in units of processing of respective different granularities, the pipeline stages being connected in descending order of processing granularities, rasterizing the drawing object to generate pixel data;

performing arithmetic processing on the pixel data generated;

generating delimiters indicating the divisions between the units of processing of the prior stage in the granularity of the unit of processing of the current stage and sending the generated delimiters to the delimiter sending part of the subsequent arithmetic processing part, changing the granularity of the delimiters received from the delimiter sending part at the prior stage and sending the delimiters to the delimiter sending unit of the subsequent stage, generating determination flags which determine, in the process of the arithmetic processing, whether or not the individual pixels are targeted for arithmetic processing in a subsequent operation pass, and ORing the determination flags determined pixel by pixel based on the delimiters indicating the divisions of units of processing at respective stages so that the determination flags are bound into the processing granularities of the respective stages, thereby generating bind flags for indicating, in the processing granularities of the respective stages, whether or not the individual units of processing are targeted for arithmetic processing in a subsequent operation pass, wherein in generating the pixel data in the subsequent operation pass, only the pixel data targeted for the arithmetic processing is generated by referring to the bind flag.

* * * * *